United States Patent
Omura et al.

(10) Patent No.: US 10,647,127 B2
(45) Date of Patent: May 12, 2020

(54) LIQUID SUPPLY PART, LIQUID EJECTION HEAD, AND METHOD OF MANUFACTURING LIQUID SUPPLY PART

(71) Applicant: CANON KABUSHIKI KAISHA, Tokyo (JP)

(72) Inventors: Atsushi Omura, Kawasaki (JP); Kazuhiko Okito, Hiratsuka (JP); Yukuo Yamaguchi, Tokyo (JP); Kyosuke Toda, Kawasaki (JP); Keiichiro Tsukuda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/265,104

(22) Filed: Feb. 1, 2019

(65) Prior Publication Data

US 2019/0240984 A1    Aug. 8, 2019

(30) Foreign Application Priority Data

Feb. 8, 2018    (JP) ................... 2018-020917

(51) Int. Cl.
*B41J 2/175*    (2006.01)
*B29C 45/16*    (2006.01)
(Continued)

(52) U.S. Cl.
CPC .......... *B41J 2/17563* (2013.01); *B01D 29/01* (2013.01); *B29C 45/006* (2013.01); *B29C 45/16* (2013.01); *B01D 29/52* (2013.01); *B01D 39/2041* (2013.01); *B01D 2239/1233* (2013.01); *B29C 2045/0063* (2013.01);
(Continued)

(58) Field of Classification Search
CPC .... B41J 2/17563; B41J 2/175; B41J 2/17596; B41J 2/17523; B41J 2/1752; B41J 2/1637; B41J 2/16; B41J 2/14; B29C 45/006; B29C 45/16; B29C 2045/0067; B29C 2045/0063; B01D 29/01; B01D 29/52; B01D 39/2041; B01D 2239/1233; B29L 2031/7678; B29L 2031/767
See application file for complete search history.

(56) References Cited

U.S. PATENT DOCUMENTS 8,550,254 B2   10/2013   Kobayashi
9,764,554 B2    9/2017   Amma et al.
(Continued)

FOREIGN PATENT DOCUMENTS

JP         5472595 B2    4/2014

OTHER PUBLICATIONS

Kitayama et al., U.S. Appl. No. 16/265,163, filed Feb. 1, 2019.

*Primary Examiner* — Justin Seo
(74) *Attorney, Agent, or Firm* — Venable LLP

(57) ABSTRACT

Peripheral portion of filters includes short-side portions and long-side portions. A first component and a second component each include a first holding section and a second holding section, the long-side portion of the filter being compressively held between the first holding sections, and the short-side portion of the filter being compressively held between the second holding sections. At least one of the first component and the second component includes a wall portion configured to isolate the long-side portion and the resin from each other. The short-side portion and the resin are in contact with each other.

15 Claims, 17 Drawing Sheets

(51) Int. Cl.
  *B01D 29/01* (2006.01)
  *B29C 45/00* (2006.01)
  *B01D 39/20* (2006.01)
  *B01D 29/52* (2006.01)
  *B29L 31/00* (2006.01)

(52) U.S. Cl.
  CPC . *B29C 2045/0067* (2013.01); *B29L 2031/767* (2013.01); *B29L 2031/7678* (2013.01)

(56) References Cited

U.S. PATENT DOCUMENTS

2009/0212460 A1\* 8/2009 Kamikura ............... B29C 65/70
   264/248
2017/0368829 A1 12/2017 Toda et al.

\* cited by examiner

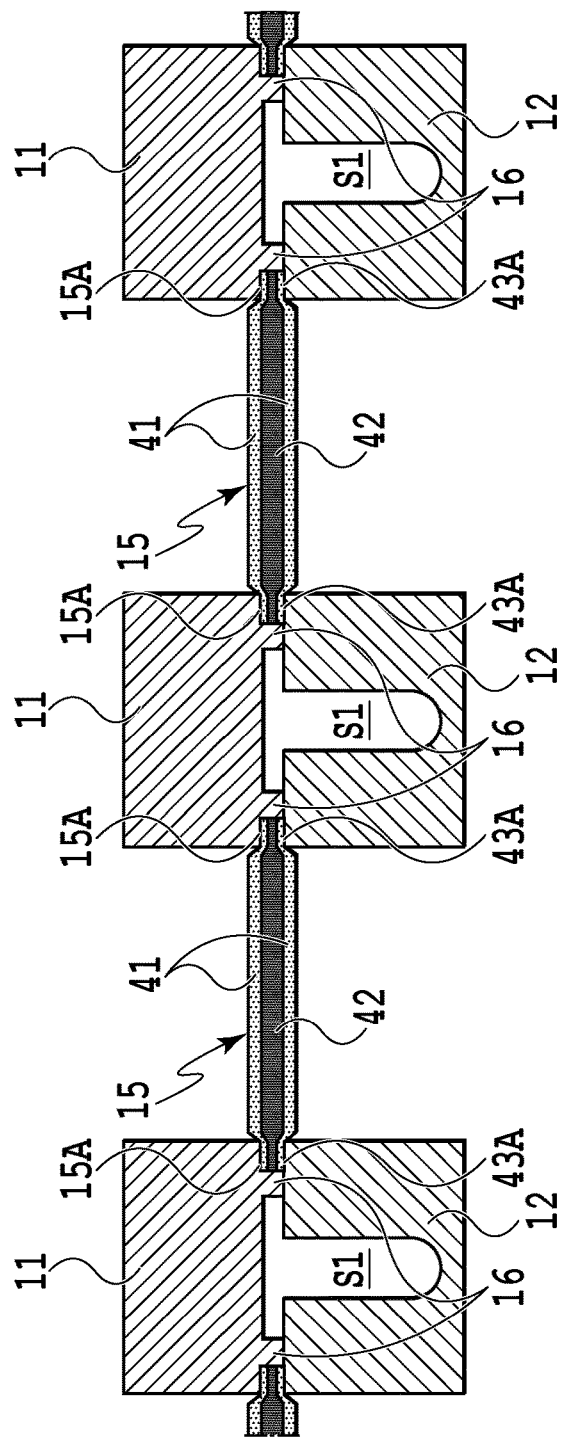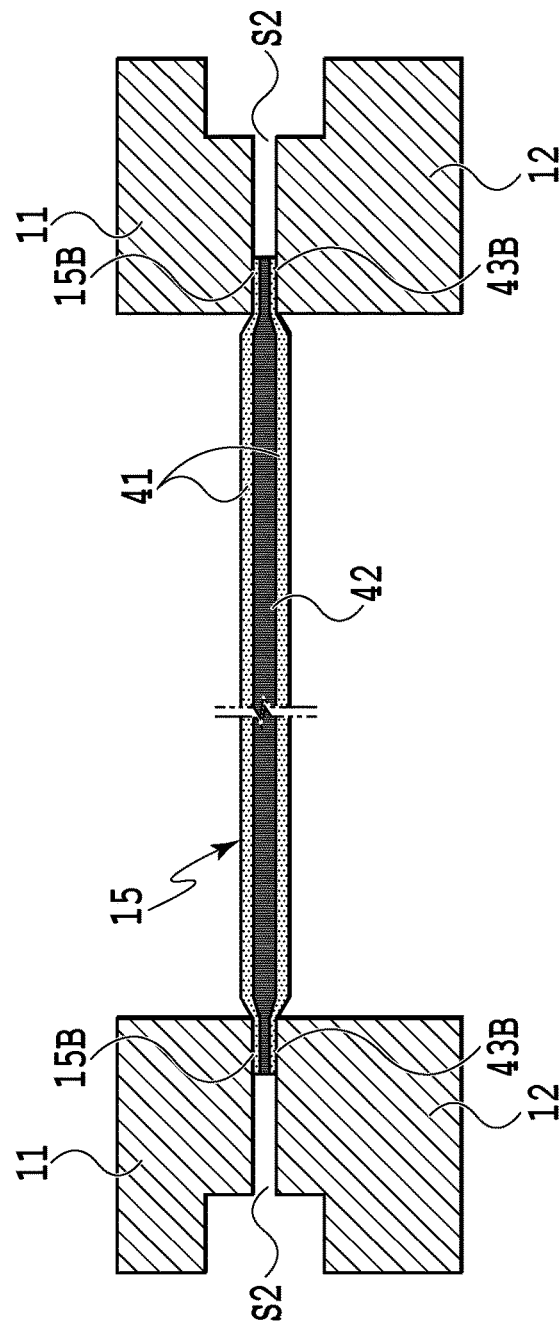
FIG.8A
FIG.8B

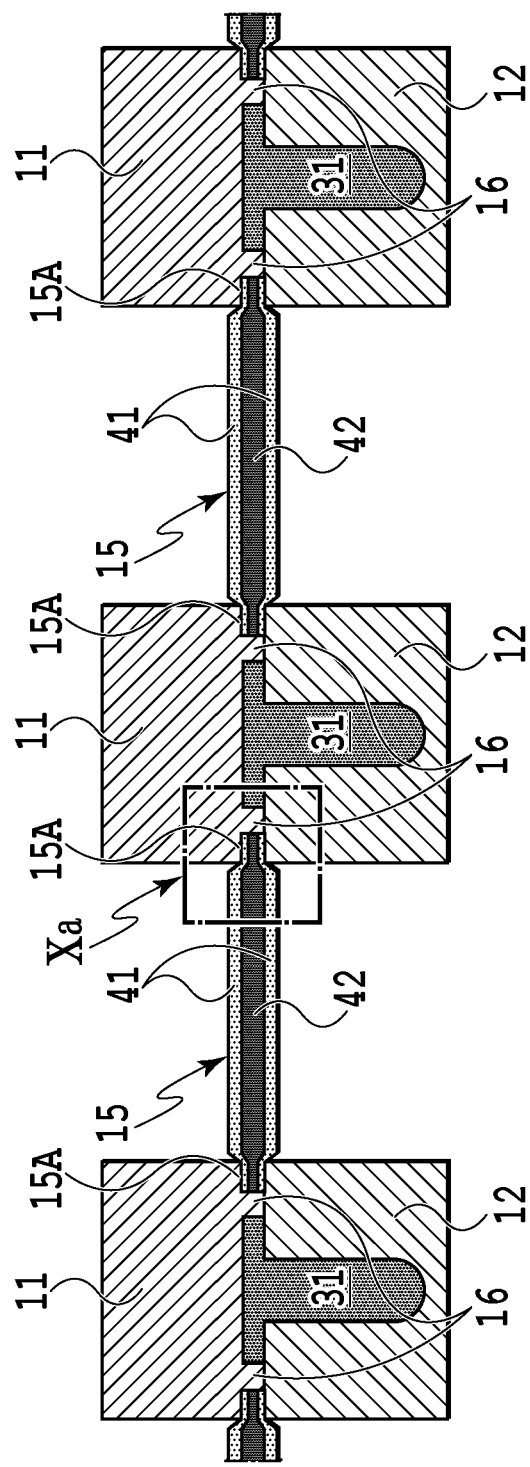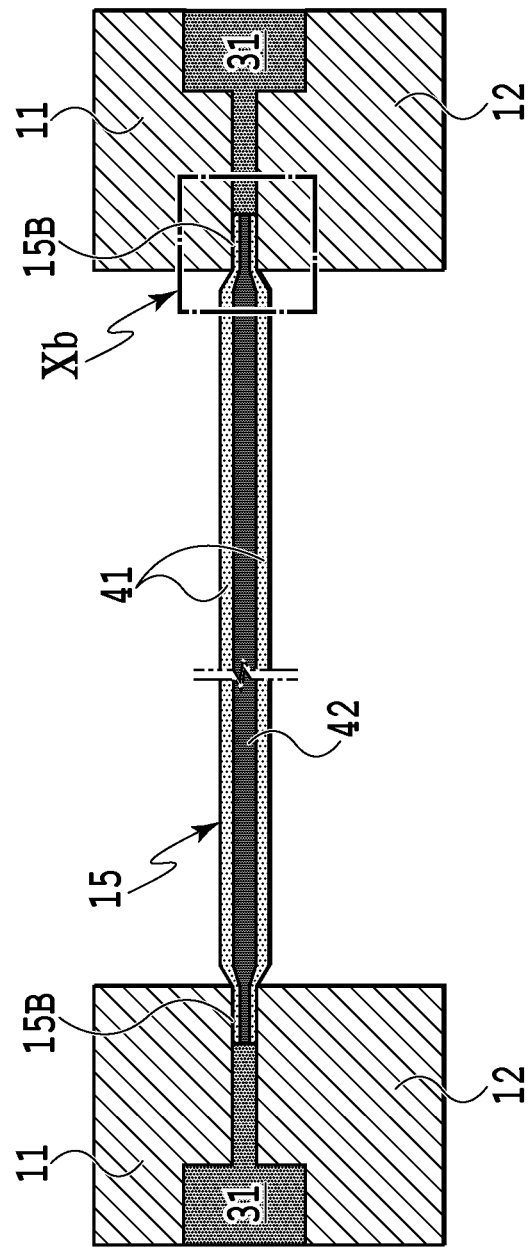
FIG.9A
FIG.9B

LIQUID SUPPLY PART, LIQUID EJECTION HEAD, AND METHOD OF MANUFACTURING LIQUID SUPPLY PART

BACKGROUND OF THE INVENTION

Field of the Invention

The present invention relates to a liquid supply part in which a supply passage for liquid is formed, a liquid ejection head, and a method of manufacturing a liquid supply part.

Description of the Related Art

Japanese Patent No. 5472595 describes a configuration in which a filter is laid between two components forming a liquid supply part such that the filter is located in a supply passage for liquid and then the two components are joined by filling the periphery of the filter with a molten resin. Wall portions isolating the entire peripheral portion of the filter from the molten resin are provided on one of the two components to suppress deformation of the filter caused by filling pressure, compression force, and the like of the molten resin.

SUMMARY OF THE INVENTION

When the wall portions are provided over the entire periphery of the filter as in Japanese Patent No. 5472595, it is possible to avoid contact between the filter and the molten resin and suppress deformation of the filter. However, foreign objects such as dusts may separate from end portions of the filter and enter the supply passage for fluid.

The present invention provides a liquid supply part, a liquid ejection head, and a method of manufacturing a liquid supply part which can suppress entrance of a foreign object, separated from a filter, into a supply passage while suppressing deformation of the filter.

In the first aspect of the present invention, there is provided a liquid supply part in which a first component and a second component are coupled to each other with a filter laid between a first opening portion of the first component and a second opening portion of the second component by pouring a molten resin between the first component and the second component, so that the first component and the second component form a liquid supply passage continuously extending through the first opening portion, the filter, and the second opening portion, wherein a peripheral portion of the filter includes a short-side portion and a long-side portion, the first component and the second component each include a first holding section and a second holding section, the long-side portion of the filter being compressively held between the first holding sections, and the short-side portion of the filter being compressively held between the second holding sections, at least one of the first component and the second component includes a wall portion configured to isolate the long-side portion and the resin from each other, and the short-side portion and the resin are in contact with each other.

In the second aspect of the present invention, there is provided a liquid ejection head comprising:

a liquid supply part in which a first component and a second component are coupled to each other with a filter laid between a first opening portion of the first component and a second opening portion of the second component by pouring a molten resin between the first component and the second component, so that the first component and the second component form a liquid supply passage continuously extending through the first opening portion, the filter, and the second opening portion; and an ejection portion capable of ejecting liquid supplied from the liquid supply passage of the liquid supply part, wherein a peripheral portion of the filter includes a short-side portion and a long-side portion, the first component and the second component each include a first holding section and a second holding section, the long-side portion of the filter being compressively held between the first holding sections, and the short-side portion of the filter being compressively held between the second holding sections, at least one of the first component and the second component includes a wall portion configured to isolate the long-side portion and the resin from each other, and the short-side portion and the resin are in contact with each other.

In the third aspect of the present invention, there is provided a method of manufacturing a liquid supply part in which a first component and a second component are coupled to each other with a filter laid between a first opening portion of the first component and a second opening portion of the second component by pouring a molten resin between the first component and the second component, so that the first component and the second component form a liquid supply passage continuously extending through the first opening portion, the filter, and the second opening portion, the method comprising:

a first step of preparing the first component and the second component;

a second step of preparing the filter having a peripheral portion including a short-side portion and a long-side portion;

a third step of compressively holding the peripheral portion of the filter between the first component and the second component; and a fourth step of pouring the molten resin between the first component and the second component such that the resin is kept out of contact with the long-side portion of the filter and permeates the short-side portion of the filter.

According to the present invention, it is possible to suppress deformation of the filter while avoiding contact between the long-side portion of the filter and the molten resin and also to suppress entrance of a foreign object, separated from the short-side portion of the filter, into the supply passage.

Further features of the present invention will become apparent from the following description of exemplary embodiments with reference to the attached drawings.

BRIEF DESCRIPTION OF THE DRAWINGS

FIG. 8A is an enlarged view of the portion VIIIA in FIG. 7A before the injection molding with the secondary molding resin, and FIG. 8B is an enlarged view of the portion VIIIB in FIG. 7B before the injection molding with the secondary molding resin;

FIG. 9A is an enlarged view of the portion VIIIA in FIG. 7A after the injection molding with the secondary molding resin, and FIG. 9B is an enlarged view of the portion VIIIB in FIG. 7B after the injection molding with the secondary molding resin;

DESCRIPTION OF THE EMBODIMENTS

An embodiment of the present invention is described below based on the drawings.

Figure 1:
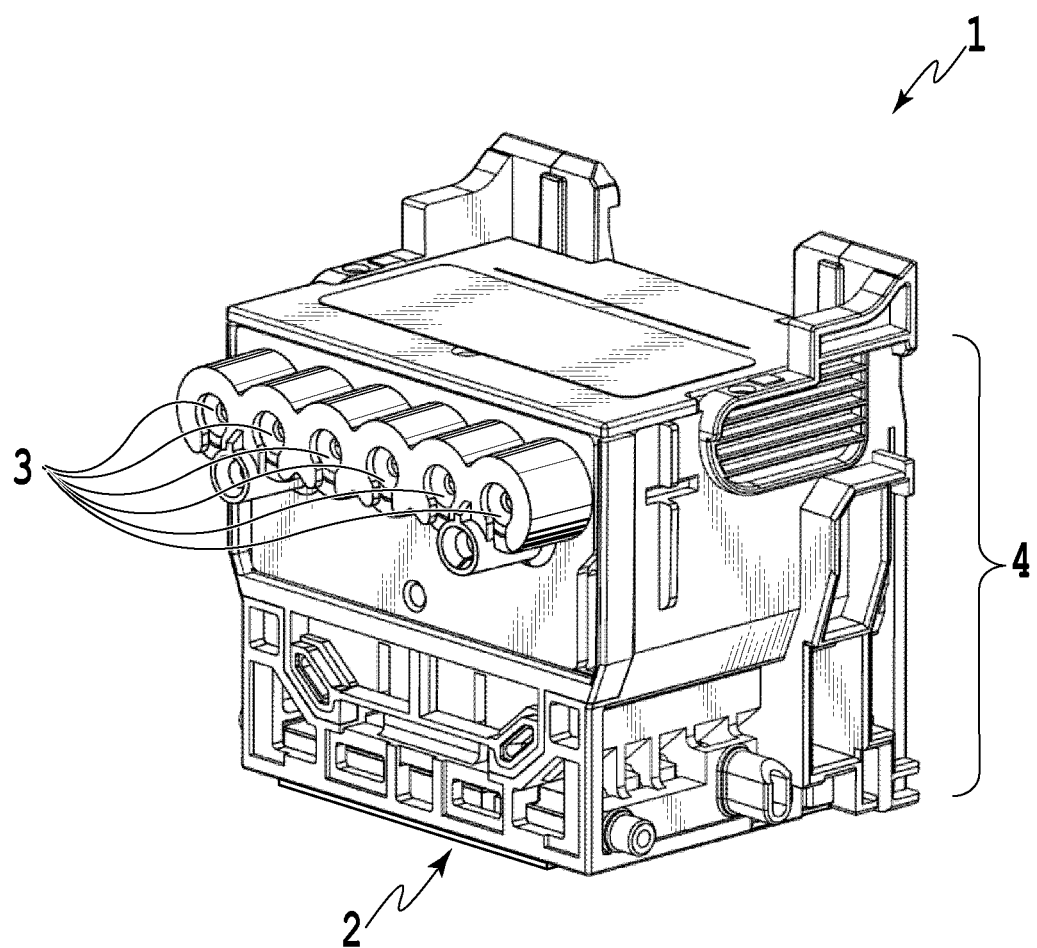
FIG. 1 is a perspective view of a printing head as a liquid ejection head of the present invention.

FIG. 1 is a perspective view of an inkjet printing head (liquid ejection head) 1 in the embodiment. In the printing head 1, inks (printing liquids) supplied from storage containers (not illustrated) are supplied to a flow passage forming body (liquid supply part) 4 via tubes and the like (not illustrated) connected to introduction ports 3. The printing head 1 includes a printing element portion (ejection portion) 2 capable of ejecting the inks downward in FIG. 1 and the flow passage forming body 4 forms ink supply passages (liquid supply passages) between the introduction ports 3 and the printing element portions 2. In the present example, six ink supply passages corresponding respectively to six introduction ports 3 are formed.

Figure 2:
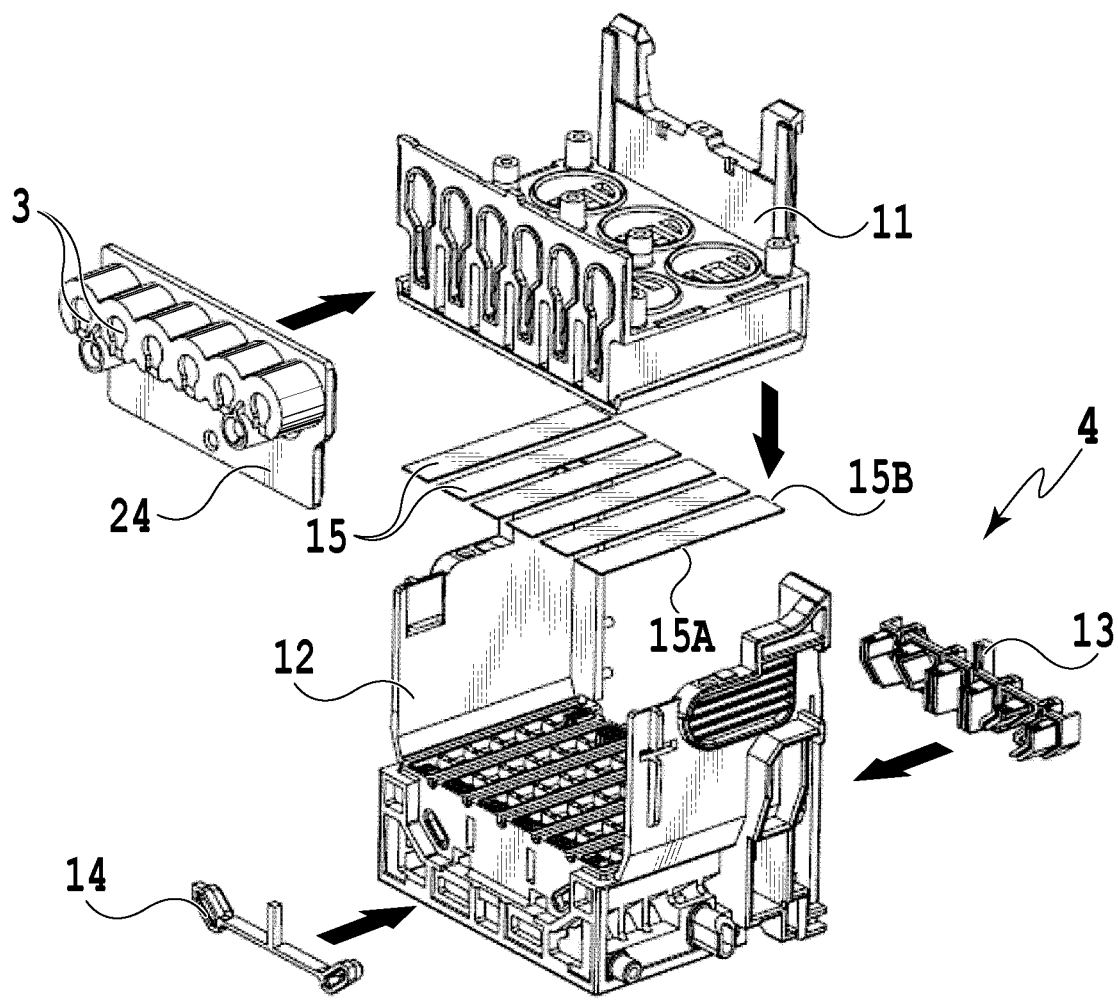
FIG. 2 is an exploded perspective view of the printing head in FIG. 1.
Figure 3:
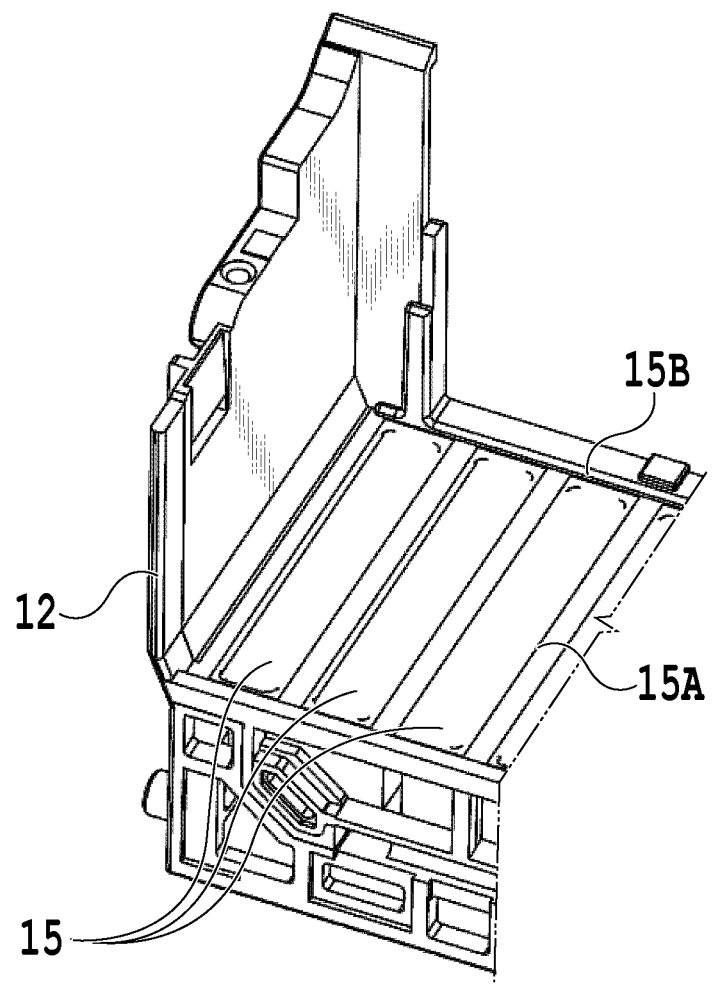
FIG. 3 is an enlarged perspective view of a main portion of the printing head in FIG. 1.

FIG. 2 is an exploded perspective view of the flow passage forming body 4. The flow passage forming body 4 includes a first flow passage forming member (first component) 11, a second flow passage forming member (second component) 12, a first lid member 13, a second lid member 14, filters 15, and an introduction port forming member 24. Total of six filters 15 are provided to be laid respectively in the six ink supply passages. FIG. 3 is a perspective view of a main portion for explaining positional relationships between the second flow passage forming member (hereafter, also referred to as "second forming member") 12 and the filters 15. The filters 15 are laid between ink supply passages on the first flow passage forming member (hereafter also referred to as "first forming member") 11 side and ink supply passages on the second forming member 12 side. Each filter 15 has a rectangular plan shape and includes long-side portions 15A extending in the longitudinal direction of the filter 15 and short-side portions 15B extending in the width direction of the filter 15. In the present example, the six filters 15 with the rectangular plan shape are arranged in parallel. However, the shape and arrangement of the filters 15 are not limited to those described above.

Making the area of each filter 15 laid in the ink supply passage large allows a large amount of ink to be supplied per unit time. Accordingly, this is advantageous in increasing the printing speed of the printing head 1. The shape of each filter 15 corresponds to the shape of an opening surface of the ink supply passage in which the filter 15 is arranged. Forming the opening surface of the ink supply passage in a square shape can achieve a lower flow resistance for the same area of the opening surface (opening area) and is advantageous in supplying the ink. However, when the first forming member 11 and the second forming member 12 are to be joined by a secondary molding resin with the filters 15 laid between the first forming member 11 and the second forming member 12 as in the embodiment to be described later, it is preferable to form the filters 15 in the rectangular plan shape.

Figure 4A:
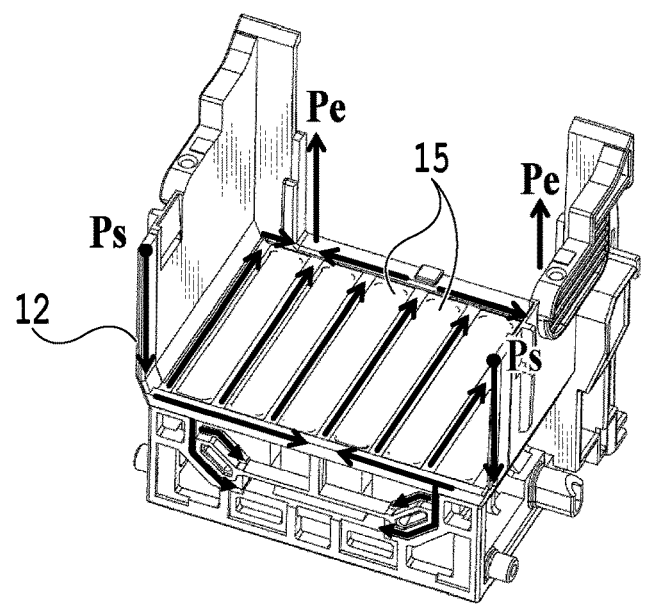
FIGS. 4A and 4B are explanatory views of flows of a secondary molding resin in a manufacturing stage of the printing head in FIG. 1
Figure 4B:
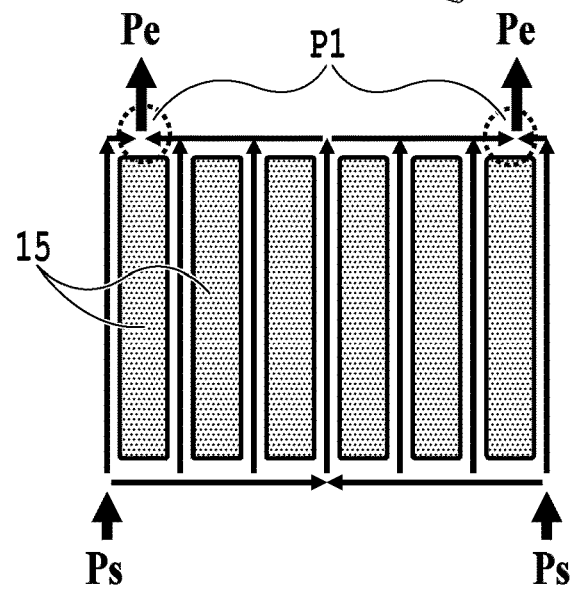

Specifically, in the embodiment, as illustrated in FIGS. 4A and 4B, the not-illustrated first forming member 11 and the second forming member 12 are coupled to each other by the secondary molding resin injection-molded with total of six filters 15 laid between the first forming member 11 and the second forming member 12. Peripheral edge portions of the filters 15 are interposed between facing surfaces of the forming members 11, 12. In the present example, the six filters 15 with the rectangular plan shape are arranged in parallel such that the long-side portions 15A thereof are adjacent to one another, and the molten secondary molding resin is poured in from positions Ps to fill a cavity in the directions of arrows and eventually flows out from positions Pe. In the injection molding with the secondary molding resin, the secondary molding resin flows into portions P1 from right and left sides in FIG. 4B. Accordingly, air bubbles may be entrapped in the portions P1. However, the portions P1 are located in end portions of the forming members 11, 12. Accordingly the air bubbles can be made to flow out from the positions Pe together with the secondary molding resin by setting the portions P1 near the positions Pe where the secondary molding resin flows out.

Figure 4C:
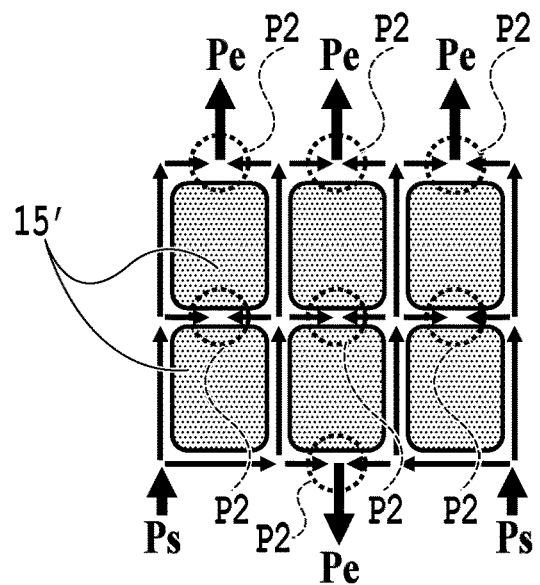
FIG. 4C is an explanatory view of flows of the secondary molding resin in the case where filters have a square plan shape.

Meanwhile, when six filters 15' with a square plan shape are arranged as illustrated in FIG. 4C, portions P2 where air bubbles may be entrapped are present also in an inner portion. Accordingly, it is difficult to provide passages allowing the secondary molding resin to flow out from such portions P2 and, when air bubbles are entrapped in these portions P2, the air bubbles cannot be removed. Entrapment of such air bubbles reduces the strength and color mixing of the inks may occur due to breakage of the ink supply passages. Moreover, when the thickness of the forming members 11, 12 in the portions P2 is increased in anticipation of reduction of the strength caused by such entrapment of air bubbles, the size of the printing head 1 is increased.

Accordingly, forming the filters 15 in the rectangular plan shape and arranging the multiple filters 15 in parallel as in the embodiment is preferable in order to increase the quality of the printing head 1 and reduce the size thereof.

Figure 5:
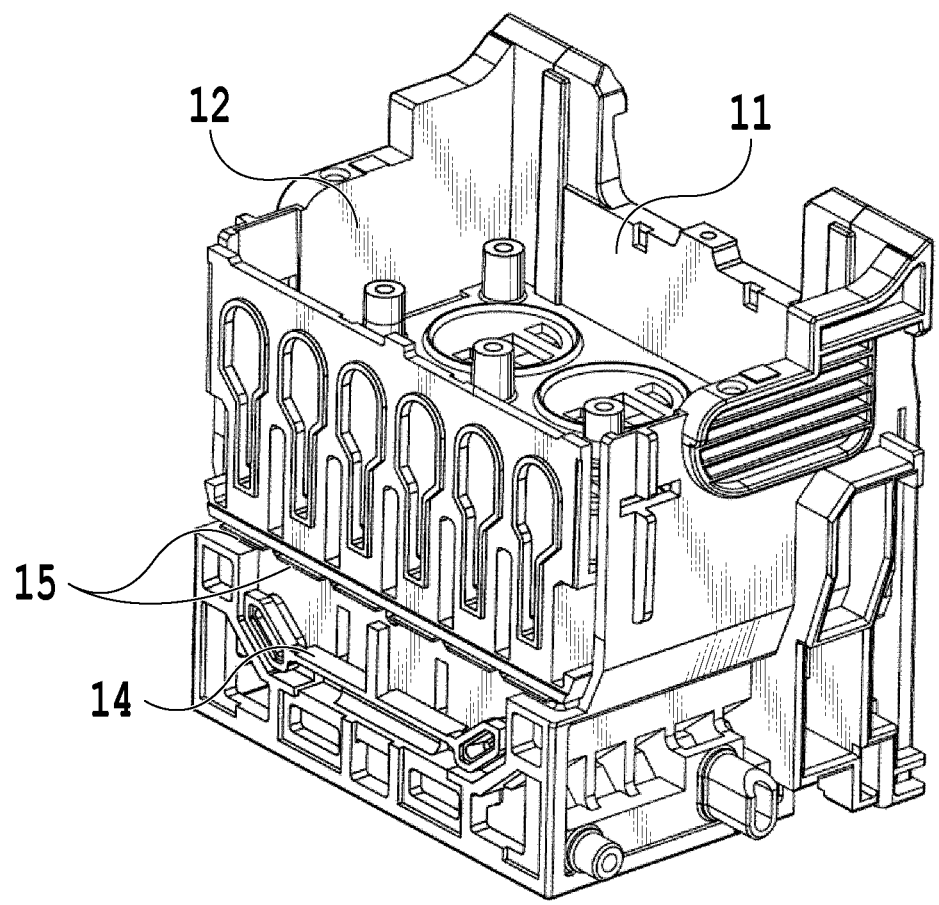
FIG. 5 is a perspective view of the printing head in FIG. 1 in a manufacturing stage before injection molding with the secondary molding resin.
Figure 6A:
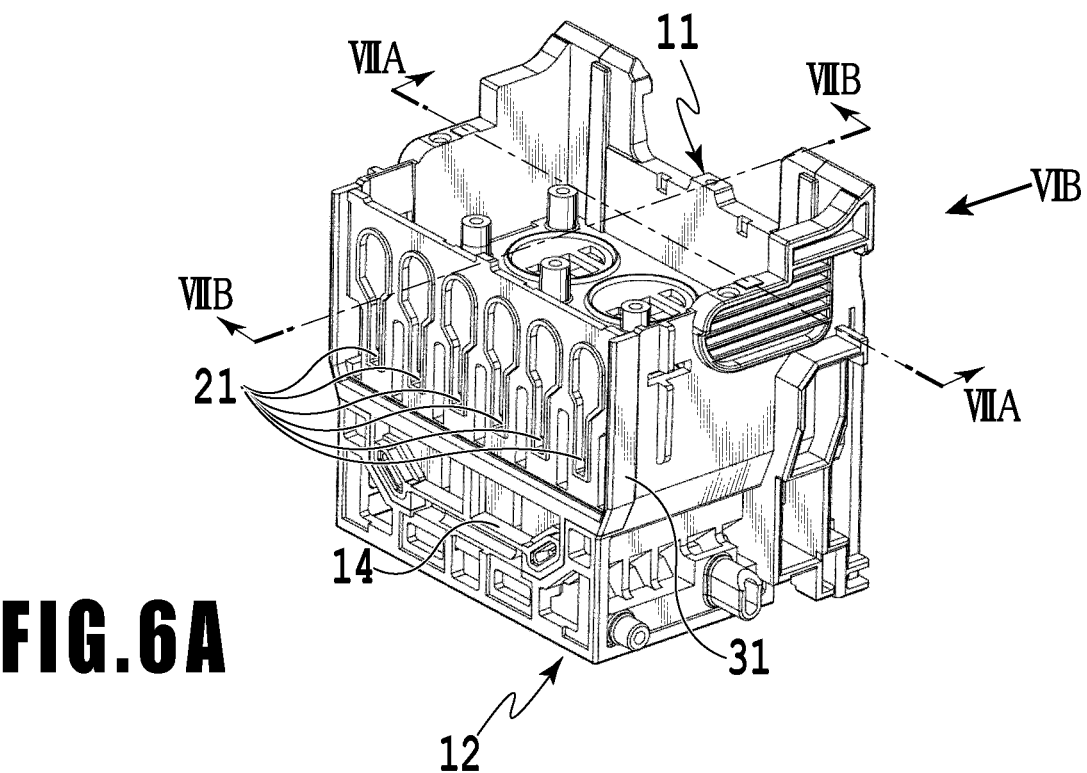
FIG. 6A is a perspective view of the printing head in FIG. 1 in a manufacturing stage after the injection molding with the secondary molding resin and FIG. 6B is a view in the direction of the arrow VIB in FIG. 6A.
Figure 6B:
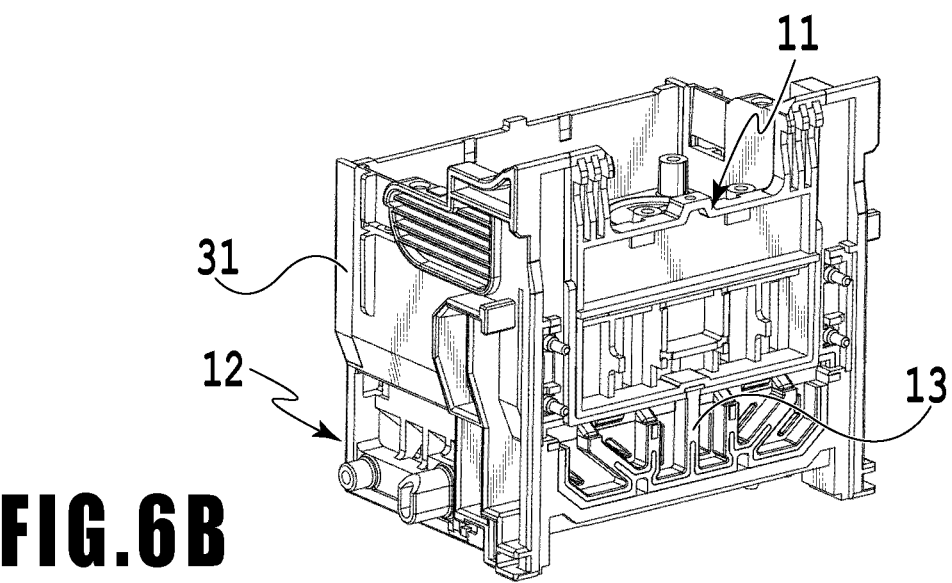

In the embodiment, first, there is performed primary molding of the first forming member 11, the second forming member 12, the first lid member 13, and the second lid member 14. Then, these primary molding bodies obtained by the primary molding and the filters 15 are assembled in an injection mold as illustrated in FIG. 5 and are fixed by injection molding (secondary molding) with a secondary molding resin 31 as illustrated in FIGS. 6A and 6B. FIG. 6A is a perspective view of the flow passage forming body 4 integrated by such secondary molding resin 31 and FIG. 6B is a view in the direction of the arrow VIB in FIG. 6A.

Figure 7A:
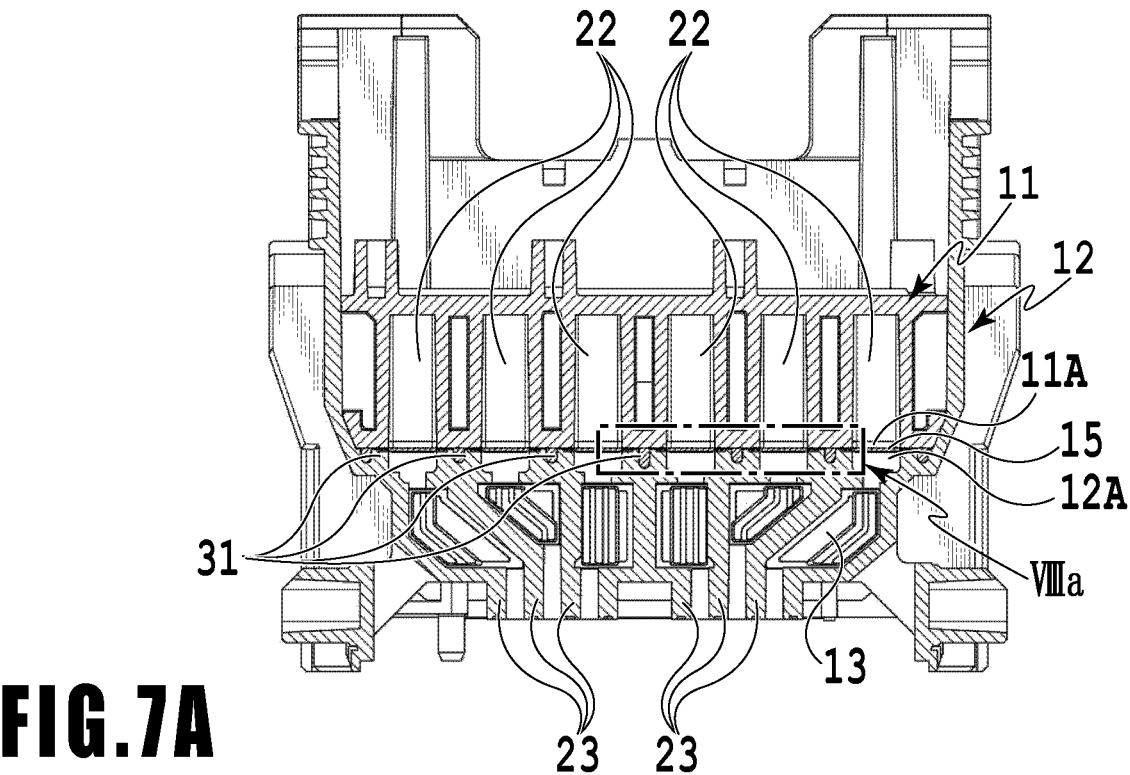
FIG. 7A is a cross-sectional view taken along the line VIIA-VIIA in FIG. 6A
Figure 7B:
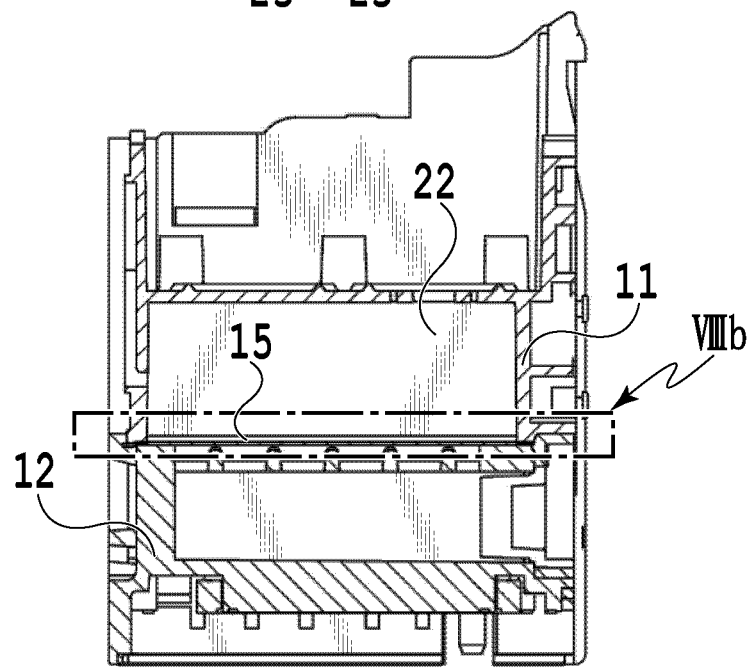
FIG. 7B is a cross-sectional view taken along the line VIIB-VIIB in FIG. 6A.

FIG. 7A is a cross-sectional view along the line VIIA-VIIA in FIG. 6A and FIG. 7B is a cross-sectional view along the line VIIB-VIIB in FIG. 6A.

The introduction port forming member 24 forming the introduction ports 3 is connected to the first forming member 11 (see FIG. 2) and sub-tank portions (liquid storage spaces) 22 communicating with the introduction ports 3 are formed in the first forming member 11. In the present example, six sub-tank portions 22 corresponding respectively to the six introduction ports 3 are formed. Sub-tank introduction ports 21 (see FIG. 6A) communicating with the introduction ports 3 of the introduction port forming member 24 are formed in the sub-tank portions 22. Ink supply ports 23 communicating with the printing element portions 2 are formed in the second forming member 12. The second forming member 12, the first lid member 13, and the second lid member 14 form ink supply passages continuously extending between the sub-tank portions 22 and the ink supply ports 23 and the inks in the sub-tank portions 22 are supplied to the printing element portions 2 through these ink supply passages. In the present example, six ink supply passages are formed between the six sub-tank portions 22 and the six ink supply ports 23. The flow passage forming body 4 includes the multiple sub-tank portions 22 which are large liquid chambers configured to trap air bubbles, dusts, and the like in the inks, the multiple ink supply ports 23 which are arranged at a pitch smaller than the pitch of the sub-tank portions 22, and the multiple ink supply passages with bent shapes which continuously extend between the sub-tank portions 22 and the ink supply ports 23.

As illustrated in FIG. 7A, first opening portions 11A communicating with the sub-tank portions 22 are formed in the first forming member 11 and second opening portions 12A communicating with the ink supply ports 23 via the bent flow passages are formed in the second forming member 12. The ink supply passages are formed to extend through these opening portions 11A, 12A. Moreover, the filters 15 are laid between these opening portions 11A, 12A.

Six groups of the printing element portions 2 are arranged to correspond respectively to the six ink supply ports 23. Multiple electro-thermal converters (heaters), piezoelectric elements, or the like are arranged in the printing element portions 2 as ejection energy generation elements for ejecting the inks and are configured to eject the inks supplied through the ink supply passages from ejection ports. When the electro-thermal converters are used, the converters can generate heat to form bubbles in the inks and utilize the energy of the formed bubbles to eject the inks from the ejection ports.

FIG. 8A is an enlarged view of the VIIIA portion in FIG. 7A before the integration with the secondary molding resin 31 and FIG. 8B is an enlarged view of the VIIIB portion in FIG. 7B before the integration with the secondary molding resin 31.

Figure 10A:
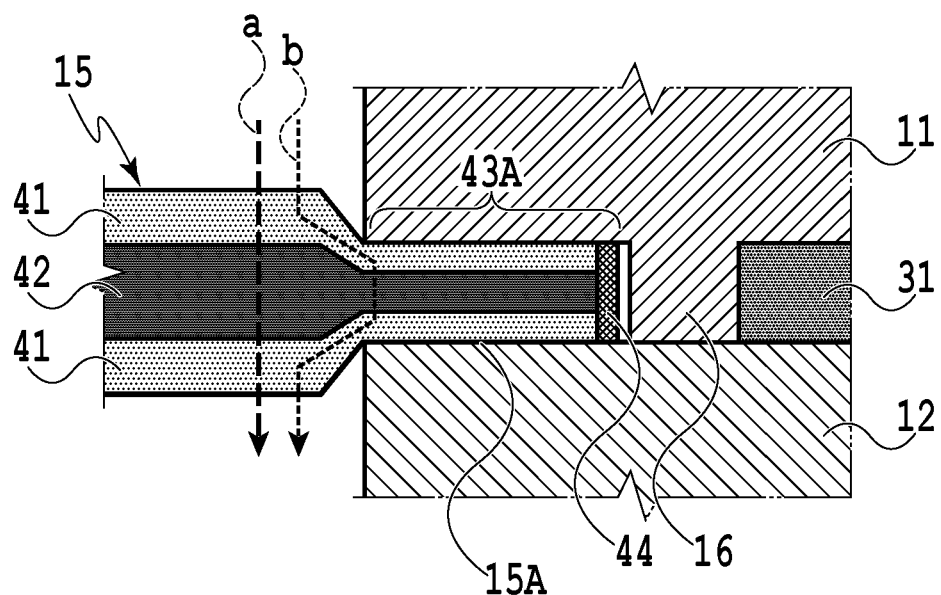
FIG. 10A is an enlarged view of the XA portion in FIG. 9A
Figure 10B:
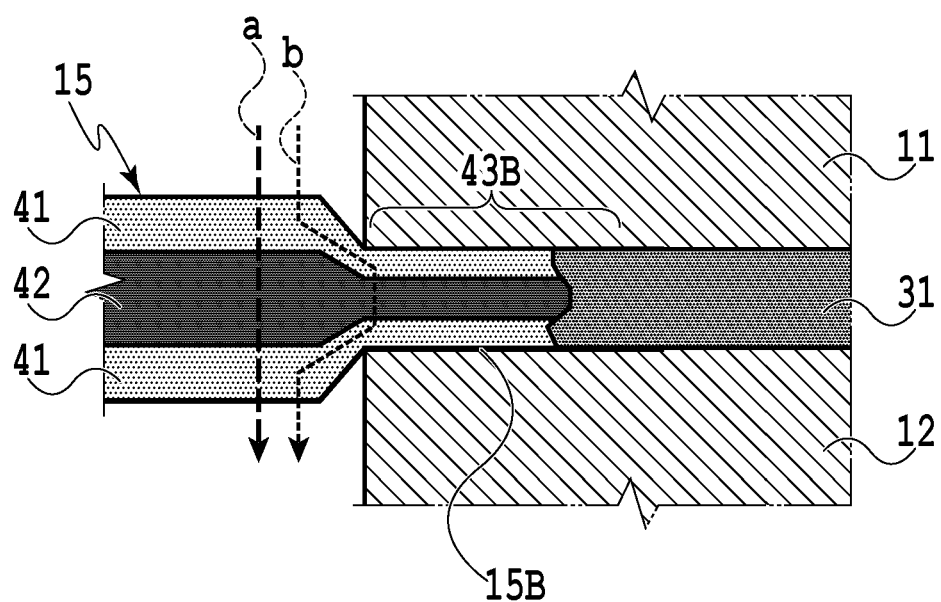
FIG. 10B is an enlarged view of the XB portion in FIG. 9B.

As illustrated in FIG. 8A, the long-side portions 15A of the filters 15 are compressively held by first holding sections 43A formed by the facing surfaces of the forming members 11, 12. Moreover, as illustrated in FIG. 8B, the short-side portions 15B of the filters 15 are compressively held by second holding section 43B of the forming members 11, 12. As illustrated in FIG. 8A, spaces S1 extending along the long-side portions 15A of the filters 15 are formed between the forming members 11, 12 and, as illustrated in FIG. 9A, the secondary molding resin 31 is poured into the spaces S1. FIG. 10A is an enlarged view of the XA portion in FIG. 9A. Moreover, as illustrated in FIG. 8B, spaces S2 extending along the short-side portions 15B of the filters 15 are formed between the forming members 11, 12 and a mold to be described later and, as illustrated in FIG. 9B, the secondary molding resin 31 is poured into the spaces S2. FIG. 10B is an enlarged view of the XB portion in FIG. 9B. Peripheries of the filters 15 are sealed between the forming members 11, 12 by pouring the secondary molding resin 31 as described above.

Wall portions 16 for preventing contact between the long-side portions 15A of the filters 15 and the secondary molding resin 31 poured into the spaces S1 are formed on at least one of the facing surfaces of the forming members 11, 12 forming the first holding sections 43A. In the present example, the wall portions 16 continuously extending along the long-side portions 15A of the filters 15 are formed on the facing surface of the first forming member 11 forming the first holding sections 43A. It is only necessary that the wall portions 16 prevent contact between the secondary molding resin 31 and the filters 15, and multiple wall portions 16 may be intermittently provided instead of being continuously provided as in the present example. For example, multiple wall portions 16 can be arranged in zig zag along the long-side portions 15A while partially overlapping one another to distribute pressure applied in the injection of the secondary molding resin 31 and suppress deformation of the primary molding bodies.

In filters including the long-side portions 15A and the short-side portions 15B as in the embodiment, the long-side portions 15A tend to deform more easily than the short-side portions 15B under pressure of the secondary molding resin. Accordingly, the aforementioned measures for suppressing the deformation by using the wall portions 16 may be applied at least for the long-side portions 15A. Since an influence of the short-side portions 15B on deformation of the filters is smaller than that of the long-side portions 15A, the wall portions do not have to be provided for the short-side portions 15B. As described later, in the embodiment, the secondary molding resin is actively brought into contact with the short-side portions 15B of the filters to permeate end portions of the filters and separation of foreign objects from the filters is thereby suppressed. As described above, the measures against deformation are taken in the long-side portions 15A of the filters while the measures against separation of foreign objects are taken in the short-side portions 15B, and this can suppress the deformation of the filters and the separation of foreign objects. Such a configuration is particularly effective when the ratio (aspect ratio) between the long side and the short side of each filter is five or more.

The original thickness of filters 15 in the present example is 0.3 mm and the first holding sections 43A compress the filters 15 to half the original thickness or smaller. This compression of the filters 15 causes the diameter of openings in the filters 15 to become smaller than that in the case where the filters 15 are not compressed. Moreover, as illustrated in FIG. 10A, the filters 15 in the example have a three layer structure including a center filter layer 42 and filter layers 41 formed on both sides of the center filter layer 42. The center filter layer 42 is made of stainless steel fibers with a wire diameter of 4 microns and forms a sintered non-woven SUS filter with a high foreign-object collection performance (collection performance of about 7 μm). The outer filter layers 41 are made of stainless steel fibers with a wire diameter of 12 microns to maintain the stiffness of the filters 15 and forms sintered non-woven SUS filters with a foreign-object collection performance of about 30 μm. The structure of the filters 15 is not specified to the three-layer structure as in the present example and may be, for example, a single-layer structure or a laminated structure with three or more layers.

Figure 11A:
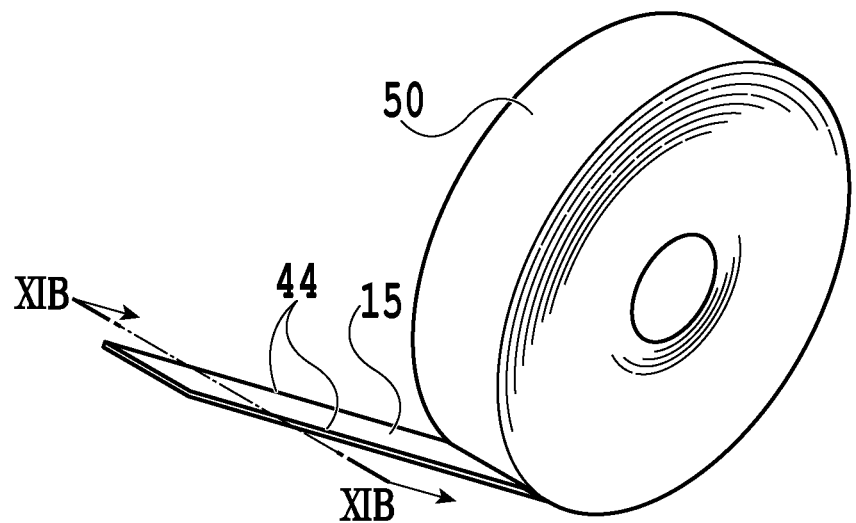
FIG. 11A is a perspective view of a long filter and FIG. 11B is an explanatory view of a filter cut out from the long filter.
Figure 11B:
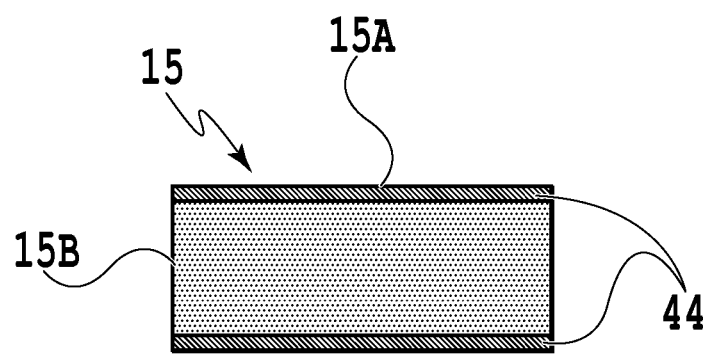

In the present example, from the viewpoint of productivity of the filters 15, as illustrated in FIG. 11A, a coiled filter (long filter) 50 obtained by winding a long filter in a coil shape on a reel is prepared, the long filter having such a form that multiple filters 15 are continuously provided in an extending direction of the long-side portions 15A. As illustrated in FIG. 11B, the filters 15 are cut out from the long filter 50 by cutting the filter 50 to desired length. Cut portions of the filters 15 form the short-side portions 15B of the filters.

Moreover, in the present example, both side portions 44 of the long filter 50 are subjected in advance to end portion processing to prevent separation of foreign objects such as dusts (including cut pieces and chips of the material forming the filter) from the both side portions 44. In the filters 15 cut out from the long filter 50, the long-side portions 15A thus correspond to the both side portions 44 subjected in advance to the end portion processing and the short-side portions 15B correspond to the cut portions not subjected to the end portion processing. This allows the filters 15 to be cut out in such a way that the yield is improved. Examples of such end portion processing include a method of heat welding the both side portions 44 with laser and similar methods. Moreover, the separation of foreign objects can be also suppressed by cleaning the filters 15 before attachment. Such cleaning is also included in the end portion processing. It is possible to cut out the filters 15 from the long filter 50 and then perform the end portion processing over the entire peripheries of the filters 15 including the short-side portions 15B, though this is inferior in terms of productivity of the filters 15. When the filter has a reel form, from the viewpoint of productivity, it is preferable to continuously clean the filter and then individually cut out the filters. In this case, although there is a possibility of foreign objects being separated from the short sides, the separation of foreign objects can be suppressed by causing the secondary molding resin to permeate the short-side portions 15B as described above.

As described above, increasing the area of the filters 15 is required to satisfy a sufficient ink supply performance through the filters 15. In order to increase the area of the filters 15 while maintaining the foreign object collection performance, it is effective to use a laminated structure with two or more layers including the filter layer 42 mainly contributing to the foreign object collection performance and the filter layer 41 mainly contributing to maintaining of the stiffness as in the present example. Moreover, the filters 15 with the laminated structure with high stiffness as in the present example are effective in securing dimensional stability of the filters 15 and a performance of handling the filters 15 with a robot or the like configured to insert the filters 15 into the mold. The filters 15 may have a laminated structure with two or more layers depending on the area and stiffness required for the filters 15.

As illustrated in FIG. 9A, when the forming members 11, 12 are joined by the secondary molding resin 31, the wall portions 16 prevent the contact between the secondary molding resin 31 and the long-side portions 15A of the filters 15. Moreover, the secondary molding resin 31 simultaneously isolates the six filters 15 from one another and joins the forming members 11, 12 to each other. The isolation of the six filters 15 isolates the six sub-tank portions 22 from one another and also isolates the six ink supply passages from one another. Moreover, as illustrated in FIG. 9B, the secondary molding resin 31 joins the forming members 11, 12 and the short-side portions 15B of the filters 15 to one another and comes into contact with the short-side portions 15B of the filters 15. As described above, the short-side portions 15B of the filters 15 cut out from the coiled filter 50 do not have to be subjected to the same end portion processing as the both side portions 44 which are the long-side portions 15A.

As illustrated in FIG. 10A, compression of the filter layers 41, 42 in the long-side portions 15A of the filters 15 by the first holding sections 43A reduces the sizes of voids formed by SUS wires forming these layers. In the present example, when the first holding sections 43A compress the filters 15, the filter openings in the filter layers 41, 42 are reduced to about 15 μm or less. Accordingly, most of the ink flows along the route a in FIG. 10A and hardly flows along the route b, and it is possible to stably secure a sufficient effective area of the filters 15. Moreover, since portions between the long-side portions 15A of the filters 15 and the secondary molding resin 31 are blocked by the wall portions 16, injection force of the secondary molding resin 31 does not act on the long-side portions 15A of the filters 15. Accordingly, deformation such as wrinkling in the filters 15 is suppressed. Moreover, the long-side portions 15A of the filters 15 are subjected to the end portion processing for suppressing the separation of foreign objects from the long-side portions 15A.

As illustrated in FIG. 10B, the second holding section 43B compress the filter layers 41, 42 in the short-side portions 15B of the filters 15. Since there are no wall portions 16 in the second holding section 43B, the secondary molding resin 31 partially enters the filter layers 41, 42 in the short-side portions 15B to permeate and seals end portions of the filter layers 41, 42. Accordingly, most of the ink flows along the route a in FIG. 10B and hardly flows along the route b, and it is possible to stably secure a sufficient effective area of the filters 15. As described above, the case where the inks pass through only the filter layers 41 with a lower foreign object collecting performance does not occur and the filters 15 can thus exhibit a desired collecting performance. Moreover, the separation of foreign objects from the short-side portions 15B of the filters 15 can be prevented. Accordingly, the short-side portions 15B do not have to be subjected to the same end portion processing as the long-side portions 15A. In other words, there is no need to perform the end portion processing on the entire peripheries of the filters 15, and by that degree, the productivity of the filters 15, further the productivity of the flow passage forming body (liquid supply part) 4 can be improved.

Next, a method of manufacturing the flow passage forming body 4 is described.

Figure 12:
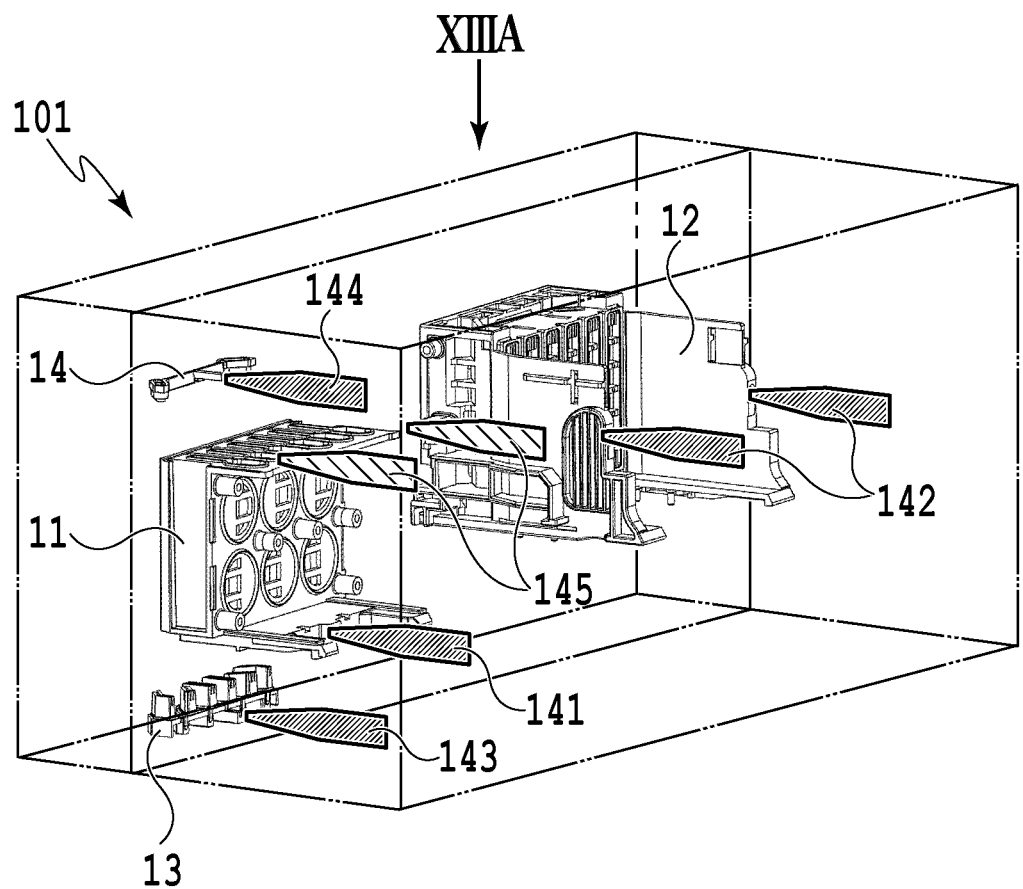
FIG. 12 is a schematic perspective view of a mold used in the present invention.

FIG. 12 is a schematic perspective view of a mold 101 for manufacturing the flow passage forming body 4. The mold 101 includes a primary molding gate 141 for molding the first forming member 11 and primary molding gates 142 for molding the second forming member 12. Moreover, the mold 101 includes a primary molding gate 143 for molding the first lid member 13 and a primary molding gate 144 for molding the second lid member 14. Furthermore, the mold 101 includes secondary molding gates 145 for joining with the secondary molding resin 31.

Figure 13A:
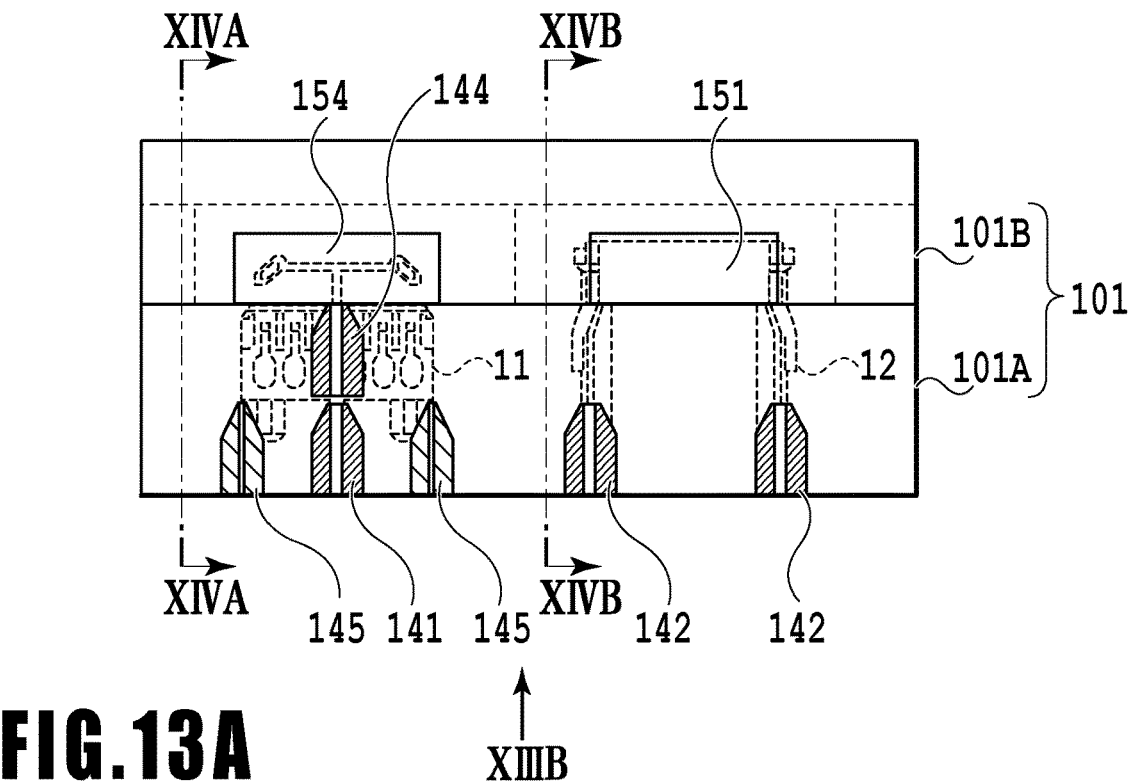
FIG. 13A is a schematic plan view of the mold in FIG. 12 as viewed in the direction of the arrow XIIIA in FIG. 12
Figure 13B:
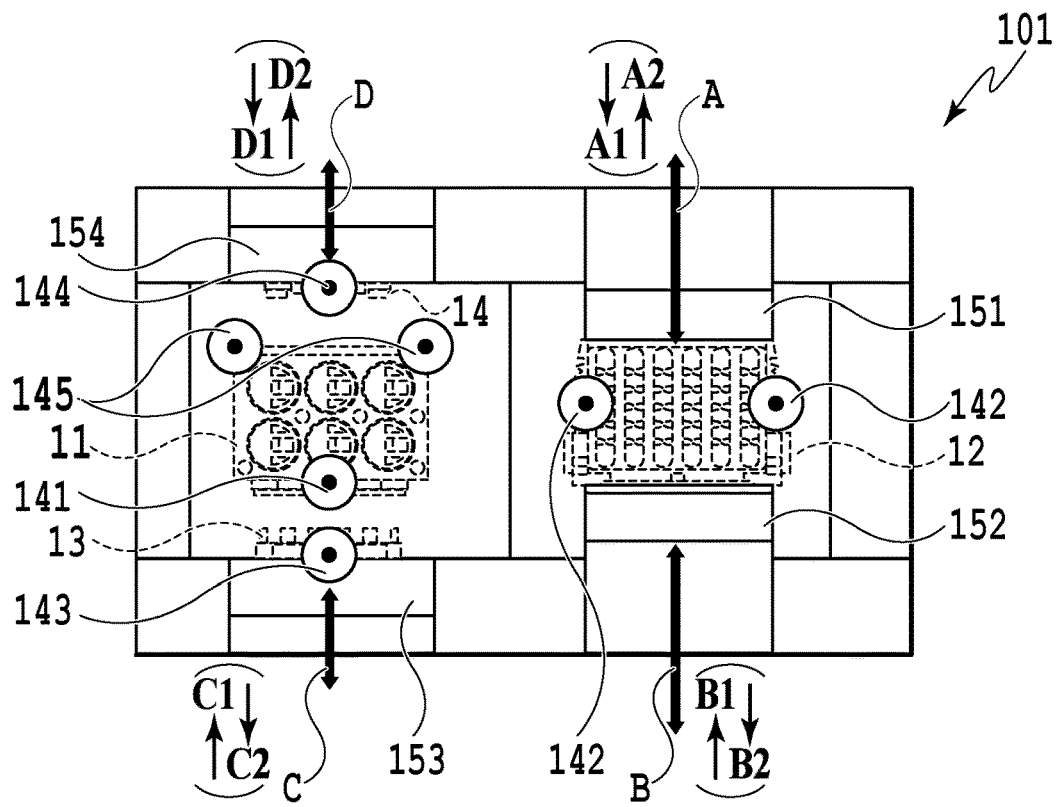
FIG. 13B is a schematic front view of the mold in FIG. 13A as viewed in the direction of the arrow XIIIB in FIG. 13A.
Figure 14A:
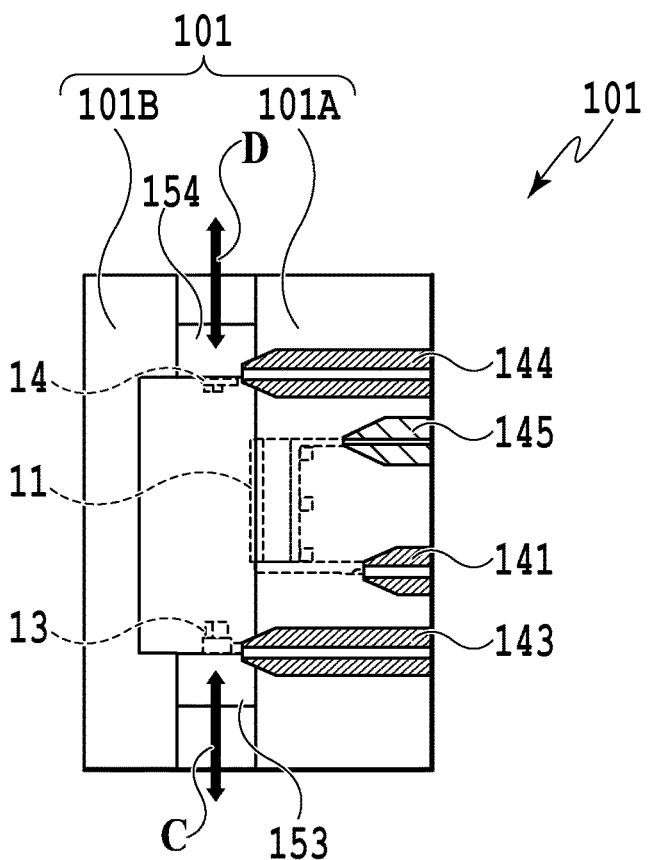
FIG. 14A is a schematic cross-sectional view along the line XIVA-XIVA in FIG. 13A
Figure 14B:
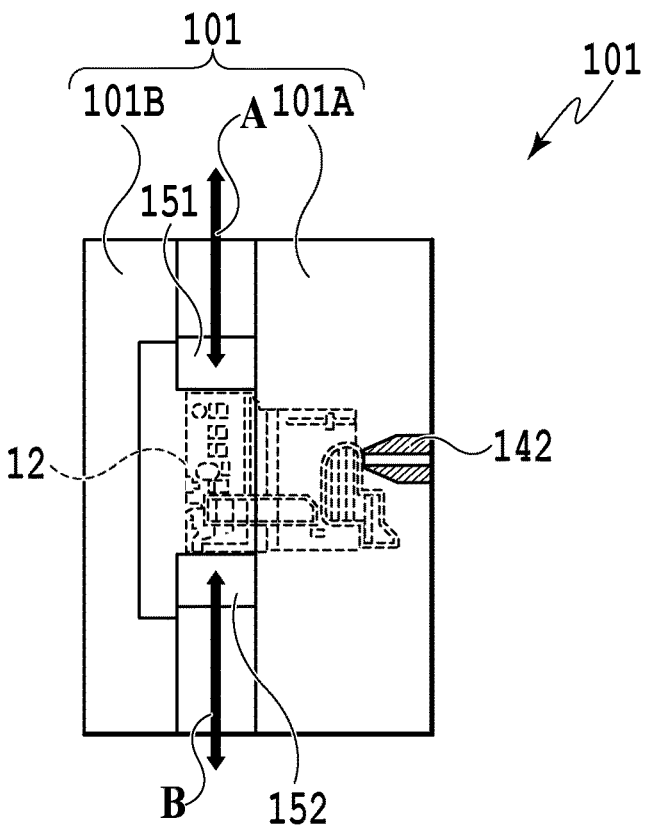
FIG. 14B is a schematic cross-sectional view along the line XIVB-XIVB in FIG. 13A.

FIGS. 13A, 13B, 14A, and 14B are explanatory views of the mold 101 just after the primary molding of the first and second forming members 11, 12 and the first and second lid members 13, 14. FIG. 13A is a view in the direction of the arrow XIIIA in FIG. 12, FIG. 13B is a view in the direction of the arrow XIIIB in FIG. 13A, FIG. 14A is a schematic view of a cross-section along the line XIVA-XIVA in FIG. 13A, and FIG. 14B is a schematic view of a cross-section along the line XIVB-XIVB in FIG. 13A. Slides 151, 152 are slides for forming the bent flow passages in the second forming member 12 and are capable of sliding in the directions of the arrows A, B, respectively. Slides 153, 154 are slides for holding the first and second lid members 13, 14 and incorporating them into the second forming member and are capable of sliding in the directions of the arrows C, D which are the same as the directions of the arrows A, B.

FIGS. 15A to 15D are explanatory views of operations of assembling the flow passage forming body 4 with the mold 101.

Figure 15A:
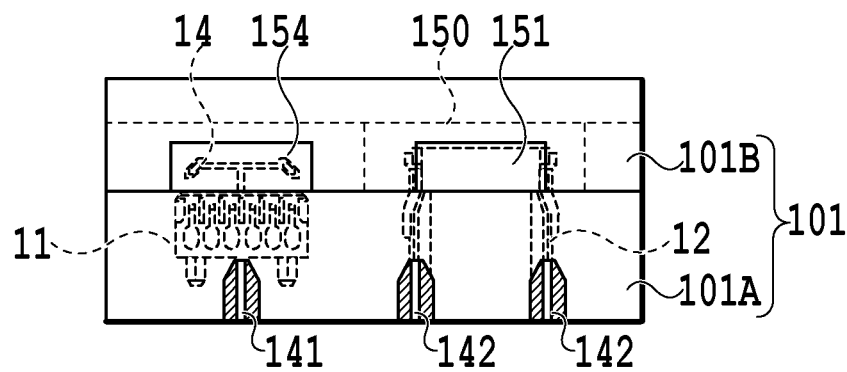
FIGS. 15A, 15B, 15C, and 15D are explanatory views of operations of the mold in FIG. 12.
Figure 15B:
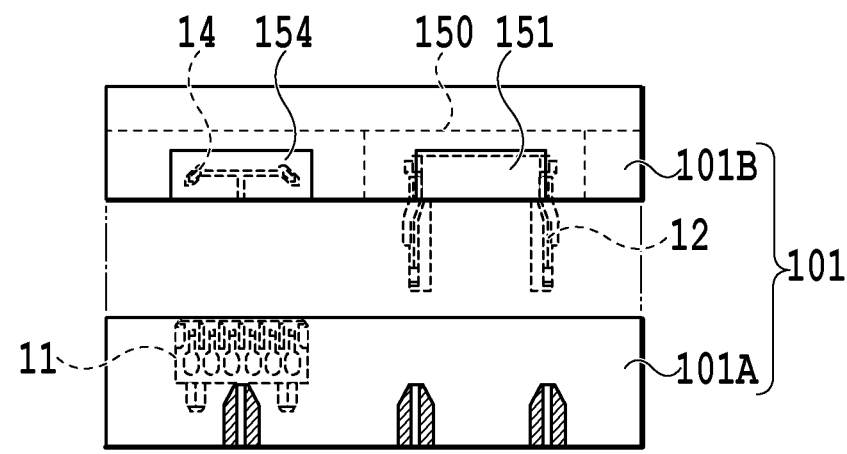

FIG. 15A illustrates a state where the primary molding of the first and second forming members 11, 12 and the first and second lid members 13, 14 is completed. These four primary molding products are molded in the mold 101. FIG. 15B illustrates a state where the mold 101 is opened. The first forming member 11 is held in a front mold (fixed mold) 101A of the mold 101 and the second forming member 12 and the first and second lid members 13, 14 are held in a back mold (movable mold) 101B of the mold 101. In this case, the first and second lid members 13, 14 are moved in the directions of the arrows C2, D2 together with the slides 153, 154 included in the movable mold 101B while being held in the slides 153, 154.

Figure 15C:
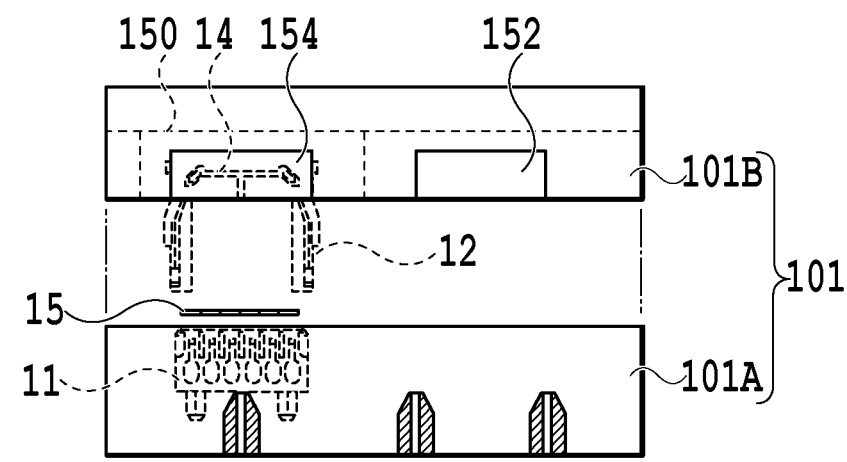

FIG. 15C illustrates a state where a die slide mechanism 150 has completed moving the movable mold 101B. The second forming member 12 held in the movable mold 101B is moved to a position facing the first forming member 11 by the die slide mechanism 150. The position where the second forming member 12 faces the first forming member 11 is also a position where the second forming member 12 faces the slides 153, 154.

Figure 15D:
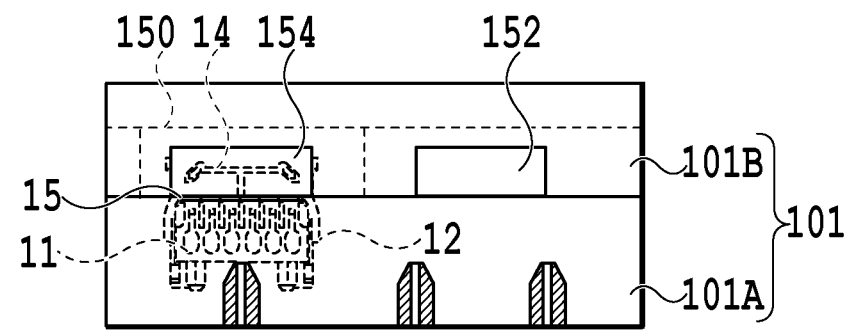

Before the mold 101 is closed again, the slides 153, 154 are moved in the directions of the arrows C1, D1 and the first and second lid members 13, 14 are brought into contact with the second forming member 12 to form the bent flow passages for the inks. In this state, the filters 15 are inserted into either the first forming member 11 or the second forming member 12 and temporarily fixed thereto. The insertion of the filters 15 is preferably performed by using a robotic hand or the like in synchronization with molding timing. FIG. 15D illustrates a state where the mold 101 is closed again for the secondary injection molding. The form in this state is the same as that in the assembly state illustrated in FIG. 5.

In the manufacturing step of FIG. 15A, the first forming member 11 is injection-molded at a position (first position) in a left portion of the pair of molds 101A, 101B in FIG. 15A and the second forming member 12 is injection-molded at a position (second position) in a right portion of the pair of molds 101A, 101B in FIG. 15A. In the manufacturing step of FIG. 15B, the molds 101A, 101B are opened such that the first forming member 11 is left in one of the paired molds (mold 101A in the present example) and the second forming member 12 is left in the other one of the paired molds (mold 101B in the present example). In the manufacturing step of FIG. 15C, the molds 101A, 101B are moved relative to each other such that the first forming member 11 and the second forming member 12 face each other, and the filters 15 are laid between the first opening portions 11A and the second opening portions 12A. In the manufacturing step of FIG. 15D, the molds 101A, 101B are closed (mold closing) to compress the filters 15 between the facing surfaces of the first forming member 11 and the second forming member 12. In the subsequent step, the secondary molding resin 31 is poured between the facing surfaces of the first and second forming members 11, 12.

In the present example, the die slide mechanism 150 is driven by an electric cylinder and the slides 151, 152, 153, and 154 are driven by hydraulic cylinders. Types of drive cylinders are appropriately selected depending on ancillary equipment, a mold space, and the like.

Figure 16A:
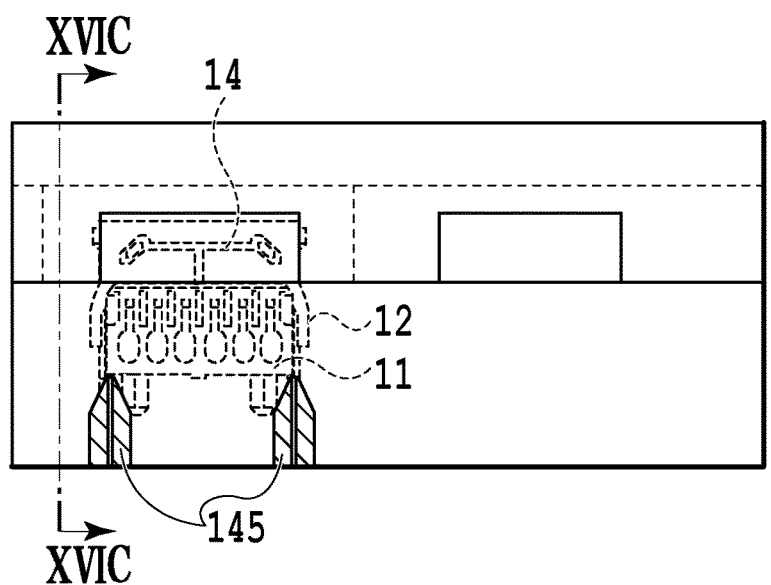
FIG. 16A is a plan view of the mold in FIG. 12.
Figure 16B:
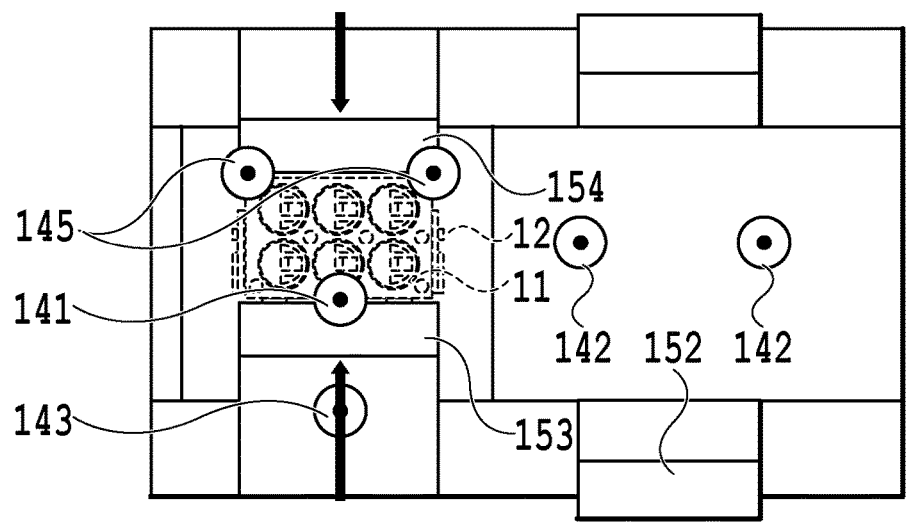
FIG. 16B is a front view of the mold in FIG. 12.
Figure 16C:
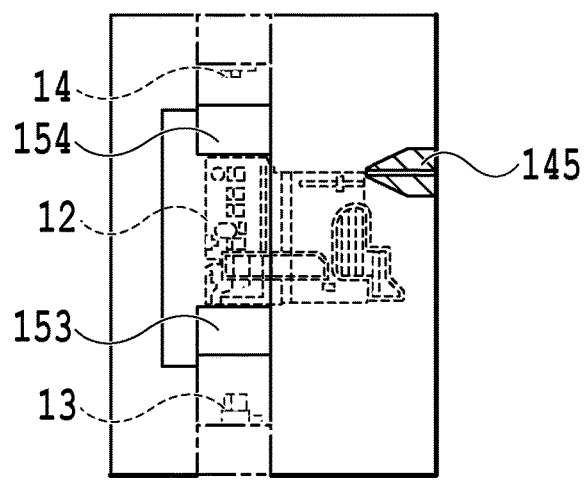
FIG. 16C is a cross-sectional view along the line XVIC-XVIC in FIG. 16A.

FIGS. 16A, 16B, and 16C are explanatory views of the mold 101 in the secondary injection molding. FIG. 16A is a plan view of the mold 101, FIG. 16B is a front view of the mold 101, and FIG. 16C is a schematic view of a cross section along the line XVIC-XVIC in FIG. 16A. Injection of the secondary molding resin 31 from the gates 145 causes the four primary molding products and the filters 15 to be integrated between the paired molds as illustrated in FIGS. 6A and 6B.

Figure 17A:
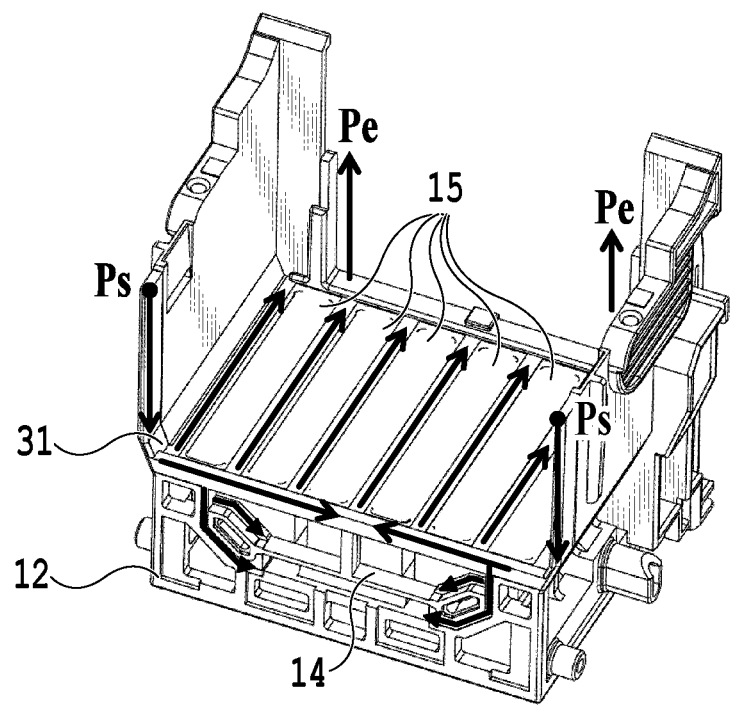
FIGS. 17A and 17B are perspective views of a second forming member as viewed from different directions to explain flows of the secondary molding resin.
Figure 17B:
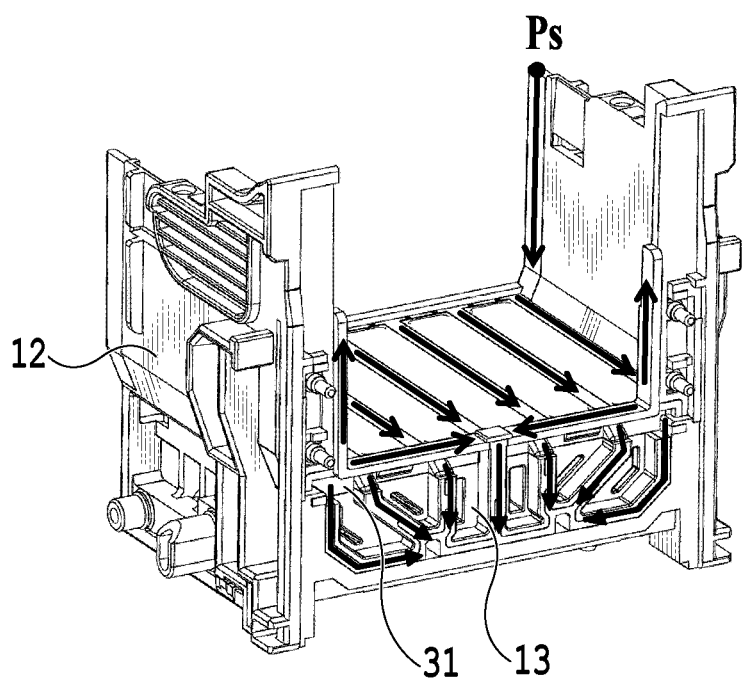

FIGS. 17A and 17B are views for explaining flows of the secondary molding resin 31 with illustration of the first forming member 11 being omitted. In the present example, the secondary molding resin 31 is injected from the two gates 145. The secondary molding resin 31 injected from the gates 145 flows from the positions Ps corresponding to the gates 145 in the directions of the arrows in FIGS. 17A and 17B and first seals the periphery of the second lid member 14. Next, the secondary molding resin 31 seals the peripheries of the filters 15 and then seals the periphery of the first lid member 13 located in a lower portion of a back surface of the second forming member 12 and also seals a portion between the first and second forming members 11, 12 located in an upper portion of the back surface of the second forming member 12 to join the first and second forming members 11, 12. It is possible to seal all peripheries of the filters 15 and form the ink supply passages by causing the secondary molding resin 31 to flow as described above.

Other Embodiments

The filters preferably have a laminated structure including at least two filter layers varying in the size of openings therein (opening diameter). For example, the configuration may be used such that the filters have a three-layer structure in which a first filter layer, a second filter layer, and a third filter layer are stacked in this order and the opening size of the first and third filter layers is larger than the opening size of the second filter layer. Moreover, sintered non-woven filters are preferable as the filters. Furthermore, the wire diameter of the non-woven fibers in the filter layer with the larger opening size is preferably three times or more than the wire diameter of the non-woven fibers in the filter layer with the smaller opening size. Moreover, the shape of the filters is not limited to a rectangular plan shape and may be any shape including a long-side portion and a short-side portion in a peripheral portion.

In the aforementioned embodiment, the length of each of the long-side portions 15A of the filters 15 is about 36 mm and the length of each of the short-side portions 15B is about 4.5 mm. The dimensions of the long-side portion 15A and the short-side portion 15B and the ratio between these dimensions in the filter 15 are not limited to these dimensions and ratio. The longer the long-side portion 15A of the filter 15 is, the greater the effect obtained by preventing the contact between the long-side portion 15A and the secondary molding resin 31 with the wall portion 16 is, that is the greater the effect of preventing formation of wrinkles in the filter 15 is. Moreover, the longer the short-side portion 15B is, the greater the effect obtained by embedding the short-side portion 15B in the secondary molding resin 31 is, that is the greater the effect of preventing the separation of foreign objects from the short-side portion 15B is. Furthermore, the greater the ratio between the length of the long-side portion 15A and the length of the short-side portion 15B is, the more likely the wrinkles are formed in the filter 15. However, preventing the contact between the long-side portion 15A and the secondary molding resin 31 with the wall portion 16 can prevent formation of the wrinkles in the filter 15 even when this length ratio is great.

Multiple filters 15 can be provided to correspond respectively to formed multiple ink supply passages. Arranging these multiple filters 15 and pouring the secondary molding resin 31 to cause it flow from one side to the other side of the long-side portions 15A of the filters 15 as illustrated in FIG. 17A allows injection molding (secondary molding) of the secondary molding resin 31 to be performed without air bubbles being entrapped.

Moreover, the present invention is not limited to the ink supply part included in the inkjet printing head and can be widely applied to liquid supply parts in which supply passages for various liquids are formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-020917 filed Feb. 8, 2018, which is hereby incorporated by reference wherein in its entirety.

What is claimed is:

1. A liquid supply part in which a first component and a second component are coupled to each other with a filter laid between a first opening portion of the first component and a second opening portion of the second component by pouring a molten resin between the first component and the second component, so that the first component and the second component form a liquid supply passage continuously extending through the first opening portion, the filter, and the second opening portion, wherein
   a peripheral portion of the filter includes a short-side portion and a long-side portion,
   the first component and the second component each include a first holding section and a second holding section, the long-side portion of the filter being compressively held between the first holding sections, and the short-side portion of the filter being compressively held between the second holding sections,
   at least one of the first component and the second component includes a wall portion configured to isolate the long-side portion and the resin from each other, and
   the short-side portion and the resin are in contact with each other.

2. The liquid supply part according to claim 1, wherein the long-side portion is a portion subjected to processing of suppressing separation of a foreign object.

3. The liquid supply part according to claim 1, wherein the wall portion continuously extends along the long-side portion.

4. The liquid supply part according to claim 1, wherein a plurality of the wall portions are provided in zig zag along the long-side portion to partially overlap one another.

5. The liquid supply part according to claim 1, wherein
   a plurality of the liquid supply passages are formed, and
   a plurality of the filters are provided to correspond respectively to the plurality of liquid supply passages and are arranged such that the long-side portions of the filters are located adjacent to one another.

6. The liquid supply part according to claim 1, wherein the filter has a rectangular plan shape.

7. The liquid supply part according to claim 1, wherein the filter has a laminated structure including at least two filter layers varying in opening size.

8. The liquid supply part according to claim 7, wherein
   the filter has a three-layer structure in which a first filter layer, a second filter layer, and a third filter layer are stacked in this order, and
   the opening size of the first filter layer and the third filter layer is larger than the opening size of the second filter layer.

9. The liquid supply part according to claim 7, wherein
   the filter is a sintered non-woven filter, and
   a wire diameter of fibers in the filter layer with the larger opening size is three times or more than a wire diameter of fibers in the filter layer with the smaller opening size.

10. The liquid supply part according to claim 1, wherein the liquid supply passage is an ink supply passage to supply ink to an inkjet printing head.

11. A liquid ejection head comprising:
   a liquid supply part in which a first component and a second component are coupled to each other with a filter laid between a first opening portion of the first component and a second opening portion of the second component by pouring a molten resin between the first component and the second component, so that the first component and the second component form a liquid supply passage continuously extending through the first opening portion, the filter, and the second opening portion; and
   an ejection portion capable of ejecting liquid supplied from the liquid supply passage of the liquid supply part, wherein
   a peripheral portion of the filter includes a short-side portion and a long-side portion,
   the first component and the second component each include a first holding section and a second holding section, the long-side portion of the filter being compressively held between the first holding sections, and the short-side portion of the filter being compressively held between the second holding sections,
   at least one of the first component and the second component includes a wall portion configured to isolate the long-side portion and the resin from each other, and
   the short-side portion and the resin are in contact with each other.

12. A method of manufacturing a liquid supply part in which a first component and a second component are coupled to each other with a filter laid between a first opening portion of the first component and a second opening portion of the second component by pouring a molten resin between the first component and the second component, so that the first component and the second component form a liquid supply passage continuously extending through the first opening portion, the filter, and the second opening portion, the method comprising:
- a first step of preparing the first component and the second component;
- a second step of preparing the filter having a peripheral portion including a short-side portion and a long-side portion;
- a third step of compressively holding the peripheral portion of the filter between the first component and the second component; and
- a fourth step of pouring the molten resin between the first component and the second component such that the resin is kept out of contact with the long-side portion of the filter and permeates the short-side portion of the filter.

13. The method of manufacturing the liquid supply part according to claim 12, wherein the second step includes:
- a step of preparing a long filter which has a form that a plurality of the filters are continuously provided in an extending direction of the long-side portions and which has both side portions to serve as the long side portions and subjected to processing for suppressing separation of a foreign object; and
- a step of cutting out the filters from the long filter by cutting the long filter to form the short-side portions of the filters.

14. The method of manufacturing the liquid supply part according to claim 12, wherein
   the first step includes a step of injection-molding the first component at a first position between paired molds and injection-molding the second component at a second position between the paired molds, and
   the third step includes:
   (1) a step of opening the paired molds such that the first component is left in one of the paired molds and the second component is left in the other mold and then moving the paired molds relative to each other such that the first component and the second component face each other;
   (2) a step of laying the filter between the first opening portion and the second opening portion; and
   (3) a step of closing the paired molds such that the peripheral portion of the filter is compressively held between the first component and the second component.

15. The method of manufacturing the liquid supply part according to claim 12, wherein in the fourth step, the resin is poured to flow from one side to the other side in an extending direction of the long-side portion of the filter.

* * * * *